United States Patent Office 3,475,054
Patented Oct. 28, 1969

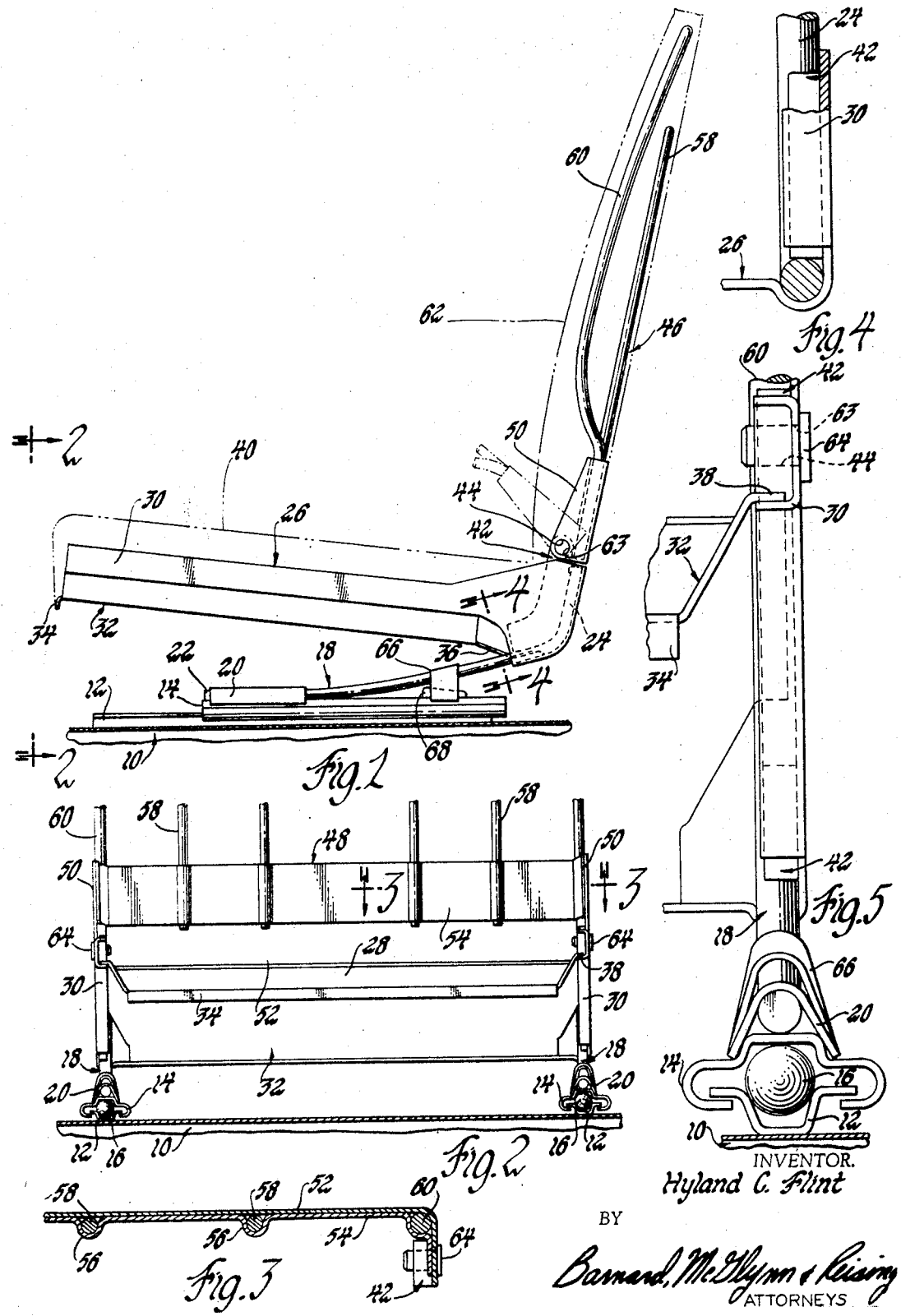

3,475,054
SEAT CONSTRUCTION
Hyland C. Flint, 3551 Walnut Lake Road,
Orchard Lake, Mich. 48033
Filed Aug. 30, 1967, Ser. No. 664,492
Int. Cl. B60n 1/00
U.S. Cl. 297—344          11 Claims

ABSTRACT OF THE DISCLOSURE

A seat construction supported on a base by means of resilient support elements extending upwardly and rearwardly from the base and adjacent the rearward end being formed substantially vertically. A seat support means is secured to the resilient support element extending forwardly therefrom in spaced relation to the base and support elements. A cushion support member is secured to the seat support means and to which a seat cushion is attached. A backrest assembly is either rigidly or pivotally mounted at the rear of the resilient support elements for vertical and horizontal movement therewith.

---

This invention relates to seat constructions, and more particularly to a seat assembly which provides full suspension for the seat and backrest and full energy absorption in both vertical and horizontal directions.

In the design and manufacture of seat assemblies, it is often desirable to provide a seat structure which is resiliently mounted and which will absorb energy in all directions of deflection or movement for the comfort of the occupant. This is particularly true in seat structures used in passenger vehicles or the like, where a seat is subject to movement as a result of the movement of the vehicle. Similarly, where the seat construction is used as a piece of stationary furniture, movements of the occupant will be transmitted to the furniture itself; and since the floor or support is rigid, full suspension and energy absorption is extremely desirable.

In vehicle or passenger conveyance usage, seat assemblies are normally designed for passenger comfort and safety by providing a complicated and cumbersome rigid frame structure with a great deal of seat and backrest cushioning to provide the resilient support for the occupant. Such seat constructions are bulky, taking up a great deal of room in the relatively small space available, and are relatively rigid in their structural design such that movements of the conveyance are transmitted readily to the frame structure and must be insulated by bulky and expensive cushioning means.

Similarly in furniture, the frame structure is generally of a rigid nature supported on a rigid floor so that any movements of the occupant of the seat must be taken up by the bulky and cumbersome cushioning rather than by any resilience in the seat or backrest frame itself.

As a result, present seating structures are space consuming, expensive and seldom comfortable when manufactured to meet occupant desires and safety regulations imposed in vehicle seating.

The device in which this invention is embodied comprises, generally, a seat construction in which the seat and backrest assembly are supported from a fixed base or floor by means of a resilient support element extending upwardly and rearwardly from the base or support and having secured thereto a seat support means extending forwardly in cantilever fashion for carrying the seat cushion. The backrest assembly extends upwardly from the resilient support elements, being secured thereto for resilient movement with the seat support.

Such a seat assembly is relatively simple and uncomplicated to manufacture and produce, and the resilient mounting between the seat and backrest assembly and the support provides full energy absorption, whether the motion comes from movement of the support or movement of the occupant, to provide the occupant with a floating sensation and extreme comfort. Since the support for the seat and backrest assembly is resilient, the overstuffed cushioning is not necessary, thus reducing the bulk and cost otherwise needed. As a result, when using the seat construction in a passenger conveyance, much less room is required for the same degree of seat cushioning and/or movement, and the seat construction becomes very economical.

These and other advantages will become more apparent from the following description and drawing in which:

FIGURE 1 is a side elevational view with parts broken away and in section of a seat construction embodying the invention.

FIGURE 2 is a partial front elevational view of the seat structure illustrated in FIGURE 1.

FIGURE 3 is a cross-sectional view of a portion of the seat construction illustrated in FIGURES 1 and 2, taken substantially along the line 3—3 of FIGURE 2 and looking in the direction of the arrows.

FIGURE 4 is a cross sectional view of a portion of the seat assembly illustrated in FIGURES 1 and 2, taken substantially along the line 4—4 of FIGURE 1 and looking in the direction of the arrows.

FIGURE 5 is an enlarged front elevational view of a portion of the seat construction illustrated in FIGURES 1 and 2.

Referring more particularly to the drawing, FIGURE 1 best illustrates a preferred form of the invention in which the seat construction is utilized in a vehicle seating for passenger use. It is to be understood at the outset that the invention is not limited to vehicle or passenger conveyance seating but is equally applicable to stationary furniture as well.

As illustrated in FIGURES 1 and 2, a base or support, indicated generally by the numeral 10, may be a vehicle floor, or the like, on which the seat construction is to be mounted. Secured on the vehicle floor 10 is a track assembly lower track 12, the track assembly being of the usual type found in movable vehicle seats. An upper track member 14 is separated from lower track member 12 by a series of balls 16 in the usual manner, the upper track 14 having inwardly turned flanges to prevent disengagement thereof as is well known in the art.

Secured to the top surface of the upper track 14 are a pair of resilient support elements, indicated generally by the numeral 18, mounted in spaced relation on the base 10. Resilient support elements 18 are shown to be of spring wire construction and secured to the upper track 14 by a channel member 20, enclosing and clamping the forward end 22 of the elements 18 against the tracks 14. In this manner, the elements 18 extend rearwardly of the channel members 20 and are held in secure engagement on the tracks 14.

Support elements 18 extend upwardly and rearwardly from the channels 20 and adjacent the rear thereof are formed more directly upwardly into upwardly extending portions 24. As will become hereinafter more apparent, portions 24 become the mounting points for the remainder of the seat assembly.

Secured to the resilient support elements 18 is the seat support means, indicated generally by the numeral 26. Seat support means 26 includes a transverse portion 28 extending across the rear of the seat construction and having forwardly directed channel portions 30 which extend in cantilever fashion over and above the base 10 and the seat support elements 18. The support means 26 may be of one piece construction, extending around the outside of the upwardly extending portions 24 and around the bend of the elements 18. Seat support means 26 are secured to the support elements 18 in any suitable manner.

Channel portions 30 of the seat support means 26 have inwardly extending flanges, providing both strengthening means and a means for supporting a cushion support element, indicated generally by the numeral 32. Cushion support element 32 includes a forward laterally extending strengthening flange 34, and at the rearward portion includes a rearwardly directed flange 36 which is receivable on and securable to the transverse portion 28 of the seat support means 26. Along the side edges of the cushion support member 32 are outwardly directed flanges 38 which are received on and secured to the lower of the inwardly directed flanges of the channel portions 30 on the seat support means 26. The cushion support means 32 is a pan structure, extending between the channel members 30 and completely covering the space between the lateral edges of the seat construction. In order to provide cushioning support for the occupant, a suitable cushion of foam rubber or the like is secured in the pan 32 and extends upwardly therefrom, as indicated by dashed and dotted lines 40.

Alternatively, the cushion support means instead of being a pan as illustrated in the drawing, could be a series of sinuous spring wire strips or the like extending between the channel elements 30 of the seat support means 26.

In order to support the weight of the occupant on the cantilevered seat support means 26, which is secured in turn to the resilient support elements 18 on each side of the bend, a pair of reinforcing plates, indicated generally by the numeral 42, are secured in any suitable manner to the resilient support elements 18 and extending on either side of the upward bend. Such reinforcing plates extend upwardly and are provided at the upper ends with apertures 44, the purpose for which will become hereinafter more apparent. With the reinforcing plates 42, the weight of the occupant on the seat support means 26 will not cause additional bending of the resilient support elements and a collapse of the seat structure.

Extending upwardly from the rearward portion of the seat construction is a backrest assembly, indicated generally by the numeral 46. Backrest assembly 46 includes a transverse member 48 having forwardly directed flanges 50 at each side thereof, the transverse portion including abutting sheet metal members 52 and 54. Member 54 has a plurality of channels 56 formed therein to receive U-shaped wire elements 58 and an outer border U-shaped element 60 in sandwich fashion. The U-shaped elements 48 and border elements 60 provide the cushion support for a backrest cushion, which extends outwardly therefrom as indicated by dashed and dotted lines 62.

The forwardly directed flanges 50 of the transverse member 48 are provided with apertures 63, aligned with and overlying the apertures 44 in the reinforcing plates 42. Extending through such apertures are pivot pins 64 which permit the backrest assembly 46 to tilt forwardly about the pivot pins 64 and over the seat support means 26, should the construction be used in a passenger vehicle requiring such tilting movement for access to the rear of the passenger compartment. In the alternative, the border wire 60 of the backrest assembly 46 may be a continuation of the resilient support elements 18 and no pivot provisions made, if there is no desire to forwardly tilt the backrest assembly.

In order to limit the vertical movement of the seat construction, upon movement of either the occupant or the vehicle in which the construction is mounted, a U-shaped strap member 66 is secured to the upper track 14 and rearwardly thereof. The strap member 66 extends up and over the resilient support elements 18 so that upon reaching a desired amount of vertical upward movement, the resilient support elements 18 will be restricted from further movement by engaging the strap member 66.

Similarly, for downward movement, a resilient bumper 68 is secured to the upper track 14 within the strap 66 so that upon excessive downward movement, the resilient member 18 will engage the bumper and be prevented from moving any further.

Thus, a seat construction is provided which is extremely resilient in its mounting to a support structure and which is full energy absorbing in vertical and horizontal directions. The seat portion is flexible around the bend of the seat support elements 18, so that the front edge of the seat has flexibility in both the cushioning means and in the movement of the support structure. The backrest assembly is also flexible about the bend in the resilient support elements 18, both forwardly and backwardly, to provide horizontal energy absorption. At the same time, the backrest moves upwardly and downwardly with the resilient support elements 18, providing the vertical energy absorption necessary. The entire result is a resiliently or flexibly supported seat construction, which is relatively simple to manufacture and produce, may be extremely slim in both seat and backrest outline and contains relatively few parts.

The embodiments of the invention in which an exclusive property or privilege is claimed are defined as follows:

1. A seat comprising: a base, a pair of spaced resilient support elements having forward ends secured to the base and extending arcuately upward and rearward from the base, a U-shaped seat support member having a lateral portion extending between and secured to the rearward portions of the spaced support elements and a pair of parallel channel portions extending forwardly from the opposite ends of the lateral portion and spaced above the base, cushion support means extending between and carried by the channel portions to receive and support a cushion thereon for resilient support above the base by the support elements, and a backrest assembly secured to the support elements and extending upwardly therefrom.

2. The seat set forth in claim 1 and further including means secured to said support elements and adapted to be secured to said base for permitting forward and rearward movement of said seat relative to said base.

3. The seat set forth in claim 1 wherein said backrest assembly is pivotally secured to said support elements for forward tilting over said cushion support means.

4. The seat set forth in claim 1 wherein said resilient support elements are spring wire.

5. The seat set forth in claim 4 and further including reinforcing plates secured to said support elements at the rear thereof, said plates having apertures in the upper extremities thereof.

6. The seat set forth in claim 5 and further including means for pivotally mounting said backrest assembly in said apertures in said reinforcing plates to permit forward tilting of said backrest assembly.

7. The seat set forth in claim 6 wherein said means for pivotally mounting said backrest assembly includes a transverse member on said backrest assembly having forwardly extending flanges overlying said reinforcing plates, said flanges having apertures therein aligned with said apertures in said plates, and pivot pins received in said apertures in said flanges and said apertures in said plates.

8. The seat set forth in claim 7 and further including track means secured to said support elements and adapted to be secured to said base for permitting forward and rearward movement of said support means relative to said base.

9. The seat set forth in claim 8 and further including movement limiting means mounted on said track means and engageable with said support elements for limiting vertical movement of said support elements relative to said base.

10. A seat comprising:
a base;
movable track means mounted in spaced relation on said base;

a pair of support wire members mounted on said track means and extending rearwardly and upwardly therefrom, said members being formed upwardly at the rear thereof;

a U-shaped seat support member having a transverse portion and forwardly extending portions, said member being secured to said support wire members at the rear thereof and said forwardly extending portions being in upwardly spaced relation to said support wire members and said base;

a cushion support element secured to said cushion support member and extending between the forwardly extending portions thereof;

reinforcing plates secured to said support wire members adjacent the rear thereof, said plates having apertures in the upper extremities thereof;

pivot members received in said apertures in said reinforcing plates; and a backrest assembly received on said pivot members and having a first position extending upwardly from said reinforcing plates and a second position tilted forwardly over said cushion support member.

11. The seat defined in claim 1 including track means securingly disposed between the support elements and the base to permit forward and rearward movement of the seat relative to the base.

References Cited

UNITED STATES PATENTS

| | | | |
|---|---|---|---|
| 1,964,424 | 6/1934 | Borah | 297—294 XR |
| 2,537,071 | 1/1951 | Lukins | 297—294 |
| 2,585,447 | 2/1952 | Eichorst | 297—376 |
| 2,695,655 | 11/1954 | Gould | 297—295 |
| 2,802,514 | 8/1957 | Ninde | 297—294 |
| 2,856,984 | 10/1958 | Simons et al. | 297—300 |
| 2,926,948 | 3/1960 | Koplin et al. | 297—378 XR |
| 3,163,409 | 12/1964 | Running et al. | 297—325 XR |
| 3,332,718 | 7/1967 | Adolf | 297—294 |

BOBBY R. GAY, Primary Examiner

G. O. FINCH, Assistant Examiner

U.S. Cl. X.R.

297—353